March 14, 1967 A. G. BODINE, JR 3,308,671
MECHANICAL RESONANT VIBRATION GENERATOR WITH FREQUENCY
STEP-UP CHARACTERISTIC
Original Filed July 6, 1959 4 Sheets-Sheet 1
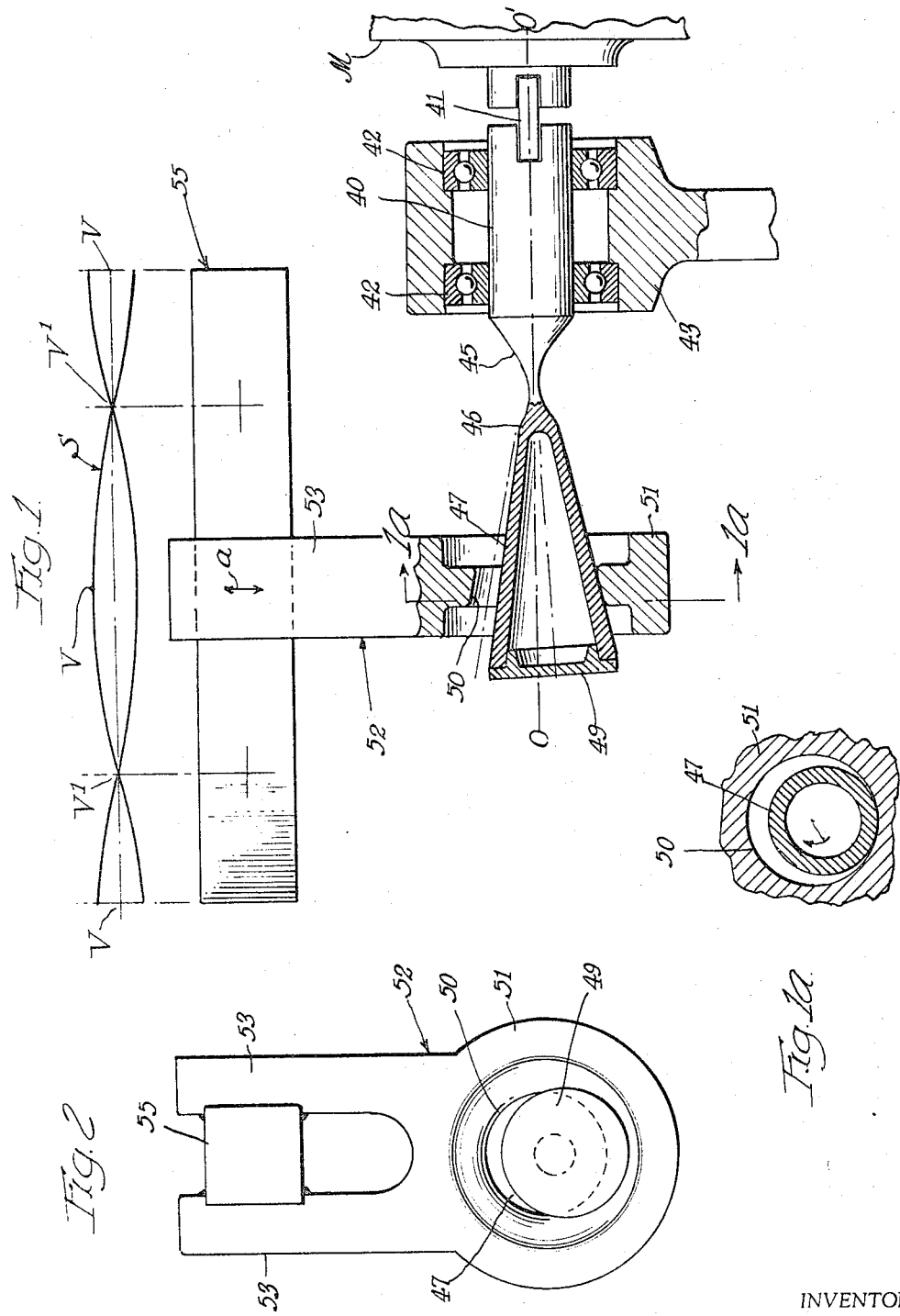
INVENTOR.
Albert G. Bodine, Jr.
BY
Attorney

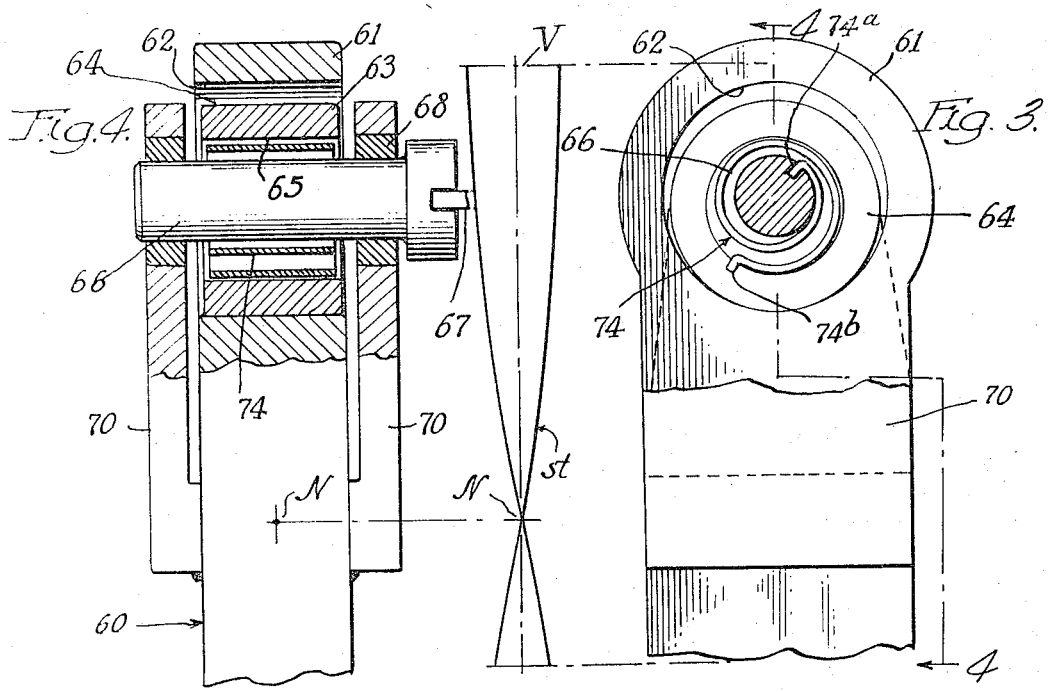
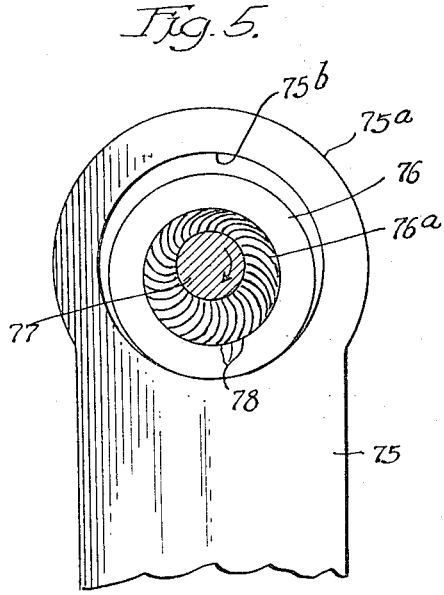

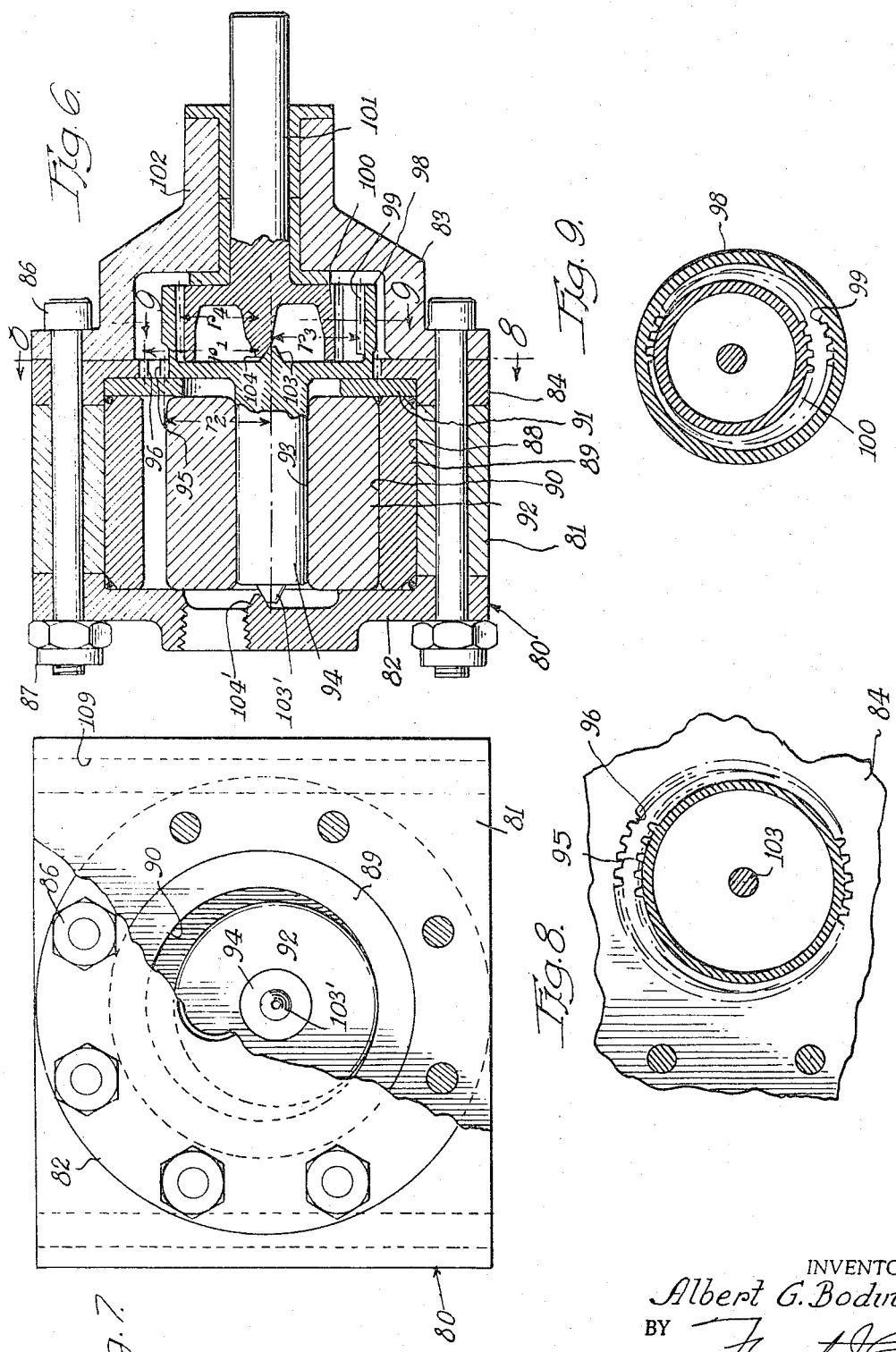

March 14, 1967  A. G. BODINE, JR  3,308,671
MECHANICAL RESONANT VIBRATION GENERATOR WITH FREQUENCY
STEP-UP CHARACTERISTIC
Original Filed July 6, 1959  4 Sheets-Sheet 4
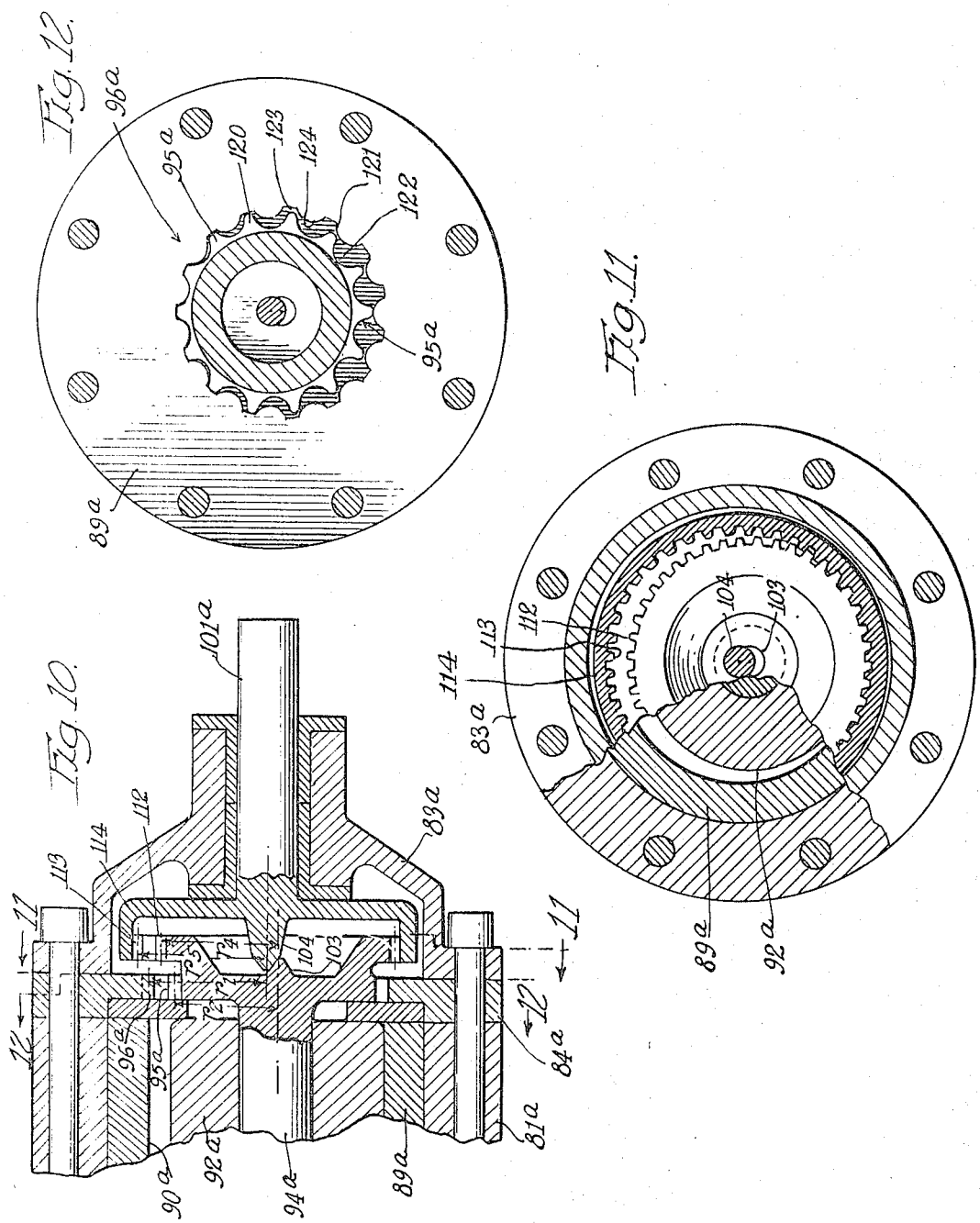
INVENTOR.
Albert G. Bodine, Jr.
BY
Forrest J. Lilly
Attorney

2

United States Patent Office 3,308,671
Patented Mar. 14, 1967

3,308,671
MECHANICAL RESONANT VIBRATION GENERATOR WITH FREQUENCY STEP-UP CHARACTERISTIC
Albert G. Bodine, Jr., Los Angeles, Calif.
(7877 Woodley Ave., Van Nuys, Calif. 91406)
Original application Oct. 8, 1964, Ser. No. 402,474. Divided and this application July 29, 1966, Ser. No. 568,818
Filed July 29, 1966, Ser. No. 568,818
5 Claims. (Cl. 74—87)

This application is a division of my copending application entitled, Mechanical Sonic Vibration Generator With Frequency Step-up Characteristic, Serial No. 402,474, filed Oct. 8, 1964, which application is a continuation-in-part of my application entitled, Apparatus for Generating and Transmitting Sonic Vibrations, Serial No. 55,537, filed Sept. 12, 1960, now Patent No. 3,153,530, which was in turn a division of my parent application entitled, Method and Apparatus for Generating and Transmitting Sonic Vibrations, Serial No. 825,117, filed July 6, 1959, now Patent No. 2,960,314. This application is also concerned with subject matter related to my copending application entitled, Sonic Vibration Generator, Serial No. 477,250, filed Aug. 4, 1965.

This invention relates generally to apparatus for the generation and transmission of relatively high power by means of intense sonic vibrations, particularly for generation or transmission of sonic vibrations in resonant vibratory mechanical devices, either elastically deformable vibratory bodies of the distributed constant class, or elastically supported bodily vibratory devices of lumped constant characteristics.

A large number of industrial uses for high-power sonic vibrations have been discovered. It is known, for example, that intense sonic energy may be applied to gases, liquids or solids to produce certain desired chemical or physical effects. Many types of power tools or other equipment are operated by sonic energy of high intensity. Illustrative examples include a longitudinally extended elastic bar, in which a longitudinal or a lateral resonant standing wave can be set up and maintained, so that an end portion of the bar becomes the location of a velocity antinode of such standing wave and utilized to do the work. Other modes of vibration are also illustrated.

The bodies or devices to be sonically vibrated at resonance are often characterized by high acoustic impedance. They vibrate with great force, and with small velocity amplitude. The problem of driving these devices, i.e., the provision of an effective vibration generator suited thereto, is often very difficult, particularly in view of the fact that ordinary, practically available sources of motivating power operate at low impedance, characterized by driver elements moving with relatively low force but substantial velocity. Ordinary low-impedance drivers are incapable of driving high-impedance devices because of the mismatch of impedance. The efficiency of transduction has been characteristically low.

The common sonic generators, such as magnetostriction bars, crystals, etc., are capable of a motion of only a few feet per second by reason of limitations set by elastic strain limits, which motion I have found to be entirely inadequate for high-power applications.

Mechancial generators are known which have the requisite motional characteristics, but suffer from complexity and a host of ensuing problems. Any degree of complexity of moving parts results in various vibratory interactions taking place at high frequency between these parts, with consequent high energy loss and frequent destruction of parts in high stress applications. At very high frequencies gears will chatter, bearing separators seize and fracture, and the individual balls or rollers of anti-friction bearings are forced to rotate so fast they become unstable in their motion. Plain journal bearings seize and overheat. The power of previously known generators has been relatively low, particularly at the higher frequencies; and the ruggedness required of an industrial machine has been lacking. Many proposed industrial applications of sonic power have been handicapped.

It is accordingly the primary general object of the present invention to provide novel and improved sonic vibration generating apparatus particularly suited to various industrial applications and characterized by relatively high power output, efficiency of transduction, simplicity, and ruggedness.

The invention is practiced in systems embodying a rotary drive oscillator involving the driving of an inertia-mass rotor in a cyclic or orbital path under guiding constraint of a stroke-limiting or bearing means, whereby a centrifugal force is exerted on the latter, with a periodic force impulse in any given radial direction, and the coupling of this bearing means to a resonator, i.e. a vibratory device having a resonant frequency range whereby said periodic force impulse is effective to vibrate said device in said range. To this end, the rotor is driven at an orbital frequency which generates a vibration frequency in the range of resonance for the driven vibratory device. I have discovered that the driven vibratory device, when so vibrating in its resonance range, with its vibration amplified by resonance, back-reacts with the orbital rotor, strongly constraining the rotor to an orbital periodicity corresponding to its own resonant frequency. I have further discovered that the apparatus tends inherently to operate on the low side of the frequency for peak resonant amplitude, and further, that the whole apparatus, driven vibratory device and orbiting rotor, tends to lock in synchronously slightly below the frequency for peak resonant amplitude. The orbiting rotor is strongly constrained to produce this frequency, and although it could of course be strongly enough driven to reach a threshold condition where it would reach and break over peak amplitude resonance frequency, considerable increase in driving effort is required before this unwanted condition occurs. In this connection it is to be understood that the driving effort on the rotor is limited to a value below such threshold condition. The rotor is hence guarded from overspeeding and destroying itself or its housing when operated at high frequency.

In addition to these effects, the constraint which keeps the frequency of the orbiting rotor to the low side of the resonance curve (amplitude vs. frequency) of the vibratory driven device is effective to establish a phase angle between the rotor motion and the motion of the vibrating device wherein optimum power is delivered from the rotor to the vibrating device for a given power input to the rotor.

It will be evident that such an orbiting rotor generator has high output impedance, while being operable by motive power at low impedance, impedance being understood to be proportional to the ratio of force to velocity. Considering the output side of the generator, where the race for the orbiting rotor is coupled to the vibratory driven device, it will be seen that the cyclic force amplitude will be high owing to the high magnitude of centrifugal force, while the stroke amplitude, and therefore the velocity amplitude, will obviously be low. The desirable high output impedance for the resonant system is therefore attained. Impedance is generally thought of in connection with alternating phenomena such as alternating forces, in comparison with resulting velocity amplitude. The motive power source used in the present instance is typically a unidirectional drive motor rather than an alternating entity. Nevertheless, the typical motor has the characteristic of relatively low force and relatively high velocity, and is, broadly speaking, a form of power having a "low impedance" quality. The generator of the invention thus fulfills the requirement of operating off a low-impedance form of power, and delivering power at high impedance.

The illustrative embodiments chosen for disclosure herein are for the most part of the type wherein the resonantly driven device is of the distributed constant type, though without implied limitation thereto. It should be explained that a "distributed constant" system is one wherein the parameters of mass and elasticity governing the resonant vibration frequency are distributed throughout all or a significant part of the vibratory system, as in the ideal example of a tuning fork. By contrast, a "lumped constant" system is one wherein the parameters of mass and elasticity governing the resonant frequency are largely concentrated or localized in discrete elements such as intercoupled masses and springs, respectively. Of course, these are idealized classifications. Practical systems usually are mixtures of the two. Thus, practical systems wherein the parameters of mass and elasticity are preponderantly "distributed" will also very commonly have local concentrations of mass, with small capability for elastic vibration therein; while practical systems wherein mass and elasticity are preponderantly localized, as in intercoupled spring and mass elements, will invariably have certain "distributed constant" qualities in view of mass inherently present in spring elements, and elasticity inherently present in mass elements. Thus, the resonantly driven devices of the invention may embody such distributed constant elements as an elastic bar, in which either transverse, gyratory, or longitudinal standing wave action may be set up by the vibration generator. Such bar may be a solid rod, or it may be tubular, as a steel pipe. The term "bar" is often used in the field of acoustics in connection with discussions of elastic wave propagation, without reference to the cross-sectional form of the "bar," and the term will be so used herein, both in the specification and claims, thus generically comprehending hollow rods, or pipes, as well as solid rods, I-beams, and other structural shapes.

The present invention concerns my discovery that a resonantly vibratory body, device or system, such as an elongated elastic bar, composed for example of steel, will contribute unexpectedly firm frequency stability to a rotary drive oscillator if the latter has a frequency step-up feature. Assume that the drive motor for the oscillator or vibration generator is an induction motor, or a fluid motor such as an air or hydraulic motor. It is of course well known that close speed control of such motors is very difficult of accomplishment. Certain rotary oscillators or vibration generators have an inherent frequency step-up. For example, though without limitation, the generator may comprise a roller rolling around the inside of a circular bearing or a raceway, the roller generally being relatively large as compared to the inside diameter of the raceway and having a typical diameter of the order, for example, of three-quarters the diameter of the raceway. A centrifugal force is thereby exerted by the roller on the raceway, with a periodic force impulse component in any given direction. For simple example, the roller may be assumed to be rotated through a flexible drive shaft, and to have sufficient traction with the raceway that it rolls therearound, the flexibility in the shaft accommodating the action. A little reflection will show that, for a roller or rotor whose diameter is a large fraction of the bore or raceway in which it works, the roller will roll many time around the bearing surface for each revolution of the drive shaft. Thus the vibration imparted to the bearing and vibratory system acoustically coupled thereto will be at correspondingly higher frequency than the rotation frequency of the drive shaft. Then assume further that the flexible drive shaft is driven by a conventional induction motor. Now, in accordance with the invention, the induction motor is driven at such a speed as will, with the frequency step-up feature taken into account, cause a vibration of the bearing means and resonantly vibratory member or system coupled thereto as will set the latter into vibration, (resonant standing wave or resonant bodily vibration) in the resonant frequency range. Now, because, as explained hereinabove, a vibratory device vibrating at resonance exerts a back-reaction or feedback control effect on such a rotary oscillator, the oscillator tends to vibrate with good frequency stability. Finally, because this resonance feedback effect holds the oscillator to a closely controlled frequency, the drive motor for the oscillator is also held at a closely controlled frequency. For example, assume an induction motor which ordinarily tends to wander up and down through a fairly wide speed range when working into typical loads, such as typically from 1725 to 1775 r.p.m. Such a motor in the present combination and with the resonantly derived control effect can be held to a variation of only a few r.p.m., or even a fraction of one r.p.m. The invention thus makes possible the generation of powerful elastic vibration frequencies with powerful, simple, reliable and economic power sources such as induction motors, fluid motors and the like, with full assurance that the output frequency of the vibrations delivered will be held within close limits.

In further explanation of the foregoing phenomena, the frequency step-up feature will be seen to give the elastically resonant vibratory member a kind of "mechanical advantage" in its feedback "hold" on or control over the drive motor. The situation is nearly analogous to a transmission gearing arrangement, where back-torque reaction of the load has a mechanical advantage against the slower running prime mover. The analogy is not actually complete, since the present system has the somewhat sophisticated additional characteristic that the control effect is owing to a manifestation of resonance in an elastically vibratory system.

The drawings show several illustrative embodiments of the invention which will now be described in detail. All of these embodiments have the frequency step-up feature discussed hereinabove, but one embodiment has a design capability for frequency step-down for any applications where such a feature may be useful.

FIG. 1 is a side elevational view, with parts in medial section, showing an illustrative embodiment of the invention;

FIG. 1a is a detail section taken on line 4a—4a of FIG. 1;

FIG. 2 is an end elevational view of the device of FIG. 1;

FIG. 3 is an end elevational view of a modified form of the invention;

FIG. 4 is a view taken in accordance with the broken line 7—7 on FIG. 3;

FIG. 5 is a view similar to FIG. 3 but showing another modification;

FIG. 6 is a longitudinal medial section through another embodiment of the invention;

FIG. 7 is an end elevation, looking toward the right, in FIG. 6;

FIG. 8 is a tranverse section on line 8—8 of FIG. 6;

FIG. 9 is a section on line 9—9 of FIG. 6;

FIG. 10 is a view similar to a portion of FIG. 6 but showing a modification;

FIG. 11 is a transverse section on line 11—11 of FIG. 10; and

FIG. 12 is a view taken as indicated by the section line 12—12 of FIG. 10, but showing a modification.

Reference is directed to FIGS. 1, 1a and 2, showing a form of the invention using a form of roller and bearing element. This embodiment shows also a type of resonantly vibratory load driven by the vibration generator. It will be understood that the speed control exerted by the resonantly vibratory driven device or system over the drive motor is substantially the same as that described.

A drive motor, typically an induction motor, is fragmentarily designated at M, and drives rotor shaft 40 through the motor drive shaft and a coupling key 41. The rotor shaft 40 is supported in bearings 42 carried in a suitable support 43 mounted on any steady base, not shown. To the left of bearing support 43, as viewed in FIG. 1, the rotor shaft 40 has a gradual reduction in diameter, as at 45, to a region 46 of minimum diameter and maximum elastic flexibility, while to the left of region 46 the rotor shaft flares in the preferred form of a cone, as indicated at 47. The cone 47 is preferably hollow from near the minimum section 46 to the large end of the cone, for purpose of holding the mass of the cone within reasonable limits, and the end of the cone may be closed by a closure plate such as indicated at 49 which may be fastened in place by low-temperature brazing. The conical portion 47 of rotor shaft 40 is normally, or in the undeformed position thereof, centered or symmetrically disposed on the longitudinal rotational axis O–O' of the system. In FIG. 1, however, the conical portion 47 of the shaft is shown as deflected angularly downward about the minimized section 46 as a bending region. The conical portion of the shaft is thus elastically deformed into this downwardly deflected position as illustrated in the figure, and such elastic deformation will be later understood as arising from the influence of centrifugal force as the rotor shaft is rotated by motor M.

The conical shaft member 47 is disposed inside a conical raceway surface 50 formed in the head portion 51 of a yoke generally indicated by numeral 52. As illustrated, the conical surface 50 conforms to the angle of the conical portion 47 of the shaft when the shaft is elastically deformed sufficiently to bear on the surface 50. In operation, the conical rotor portion 47 rolls around the conical seat 50 when driven by drive motor M. By virtue of centrifugal force, the rotor bears against the raceway surface 50, and exerts thereon, as will be seen, a rotating force vector. It will, of course, be appreciated that the conical rotor will tend to deflect in one direction or another as the rotor is brought up to speed, any slight imbalance in the rotor with respect to the axis O–O' being effective to throw the conical rotor into off-center position, whereby it comes into engagement with the confining conical bearing surface 50, and then travels thereabout by rolling contact. Here the contact point of the rolling member makes a number of revolutions while the drive motor and the rotor shaft itself makes a single revolution, thus accomplishing a frequency step-up effect.

The bearing surface 50 is on a yoke member 52, as mentioned hereinabove. Between the yoke arms 53 is rigidly mounted the center point or portion of the elastically vibratory member 55 which is to be driven at its resonant frequency. In this case, the member 55 comprises a rectangular elastic beam, composed of steel or similarly good elastic material. In the illustrative embodiment, the purpose is to set up in the elastic beam 55 a full-wavelength, lateral mode of resonant standing wave vibration, at the natural standing wave frequency of the beam 55, and such a standing wave is indicated at S in FIG. 1, where the width of the diagram at any point along its length represents the vibration amplitude of the corresponding point on the beam. The standing wave S will be seen to have, as is usual in full-wavelength standing waves, velocity antinodes V at the two ends, a velocity antinode V at the center, and velocity nodes V' one-quarter of the length of the beam inwardly from each of the ends thereof. Such a vibratory member constitutes a distributed constant vibratory system, and is best set into resonant frequency vibration by applying to it, at one of its velocity antinodes, a periodic vibratory force in the resonant frequency range of the beam. The yoke 52, receiving gyratory force impulses from the rotating conical rotor member 47, transmits such force impulses via the yoke arms 53 to the beam 55, and it will be clear that the components such force impulses direct toward and from the beam 55 are exerted on the beam at its middle velocity antinode, as indicated by the double-headed arrow a in FIG. 1. When these force impulses are in the resonant frequency range of the beam, the beam is set into resonant standing wave operation, as represented by the diagram S.

A back-reaction from the resonantly vibratory device, here the beam 55, acts with the aid of frequency step-up to speed-control the motor driving means.

FIGS. 3 and 4 show another embodiment of the invention, with a modified form of elastic torque transmitting means between the drive shaft and the inertia rotor. The vibratory device to be driven in its resonant frequency range is again in this case an extended elastic bar or beam, generally designated at 60, but only fragmentarily shown in the drawings. Actually, a little more than the upper quarter of the beam 60 appears in the drawing. This beam 60 has at its upper extremity an enlarged head portion 61 formed with a transverse bore 62 serving as a raceway for a presently described inertia rotor. The inertia rotor is designated generally at 63, and comprises a hollow cylinder having an outside peripheral surface 64 adapted to roll around the inside of bearing surface 62, and an internal bore 65. A drive shaft 66 projects coaxially through the bore 62 in beam 60, having a somewhat lesser diameter than the interior diameter of the cylindrical inertia rotor 64, in proportions such as typically shown. The drive shaft 66 will be understood to be driven from a suitable drive motor, such as an induction motor, through a coupling means such as 67 from the drive shaft of such motor, the motor not appearing in FIGS. 3 and 4 and being understood to be provided for example in the typical and preferred arrangement suggested in FIG. 1. Shaft 66 is journalled in bushings 68 mounted in bracket arms 70 which extend downwardly along the sides of the upper end portion of the bar 60, and are connected to the latter, as by welding, in the region of the upper velocity node N of the standing wave pattern set up in the bar 60. The partial standing wave diagram *st* in FIG. 3 shows the resonant wave pattern in the upper end portion of the bar 60, and shows that there is a node N of the wave *st* at approximately one-quarter of a wavelength of the bar downwardly from its upper extremity. A velocity antinode V occurs at the upper extremity of the bar. Since the nodal region N is a region of minimized vibration amplitude, the bracket arms 70 are supported from a portion of the bar 60 which stands nearly or substantially stationary. The shaft 66 thus is afforded bearing support in substantially stationary bearing elements, so that the shaft 66 remains in good alignment with the drive motor (not shown) for the shaft 66.

A flexible or elastic interconnecting element is provided between the drive shaft 66 and the inertia rotor 64, and in this typical instance comprises a flat coil spring 74, having one extremity 74a set tightly into drive shaft 66, and one extremity 74b set tightly into the interior of the inertia ring 64. Driving torque from the drive shaft 66, driven by the drive motor, is thus transmitted to the inertia rotor 64 through the flexible or elastic spring member 74. The latter is thereby caused to roll around the inside of the bearing surface 62, with transmission of gyratory force, combined with frequency step-up, to the upper end extremity 61 of the bar 60. It will, of course, be understood by those versed in the science of acoustics that the upper end extremity of an elastic, elongated bar is a desirable location for setting up in the bar a mode of elastic, resonant standing wave vibration. The systems of FIGS. 4 and 5 could actually be used to set up in the bar 60 either a longitudinal standing wave, or a lateral standing wave, but the latter is assumed for present purposes. Accordingly, the shaft 66 is driven by the drive motor at a speed to accomplish, through the step-up in frequency arising out of the rolling action of the rotor 64 around the raceway 62, a component of cyclic force impulse applied laterally against the upper end portion of the bar in the resonant frequency range of the bar for its lateral mode of resonant standing wave vibration. The lateral mode of standing wave vibration will then be emphasized and amplified. Since the cyclic frequency will in this case be substantially removed from the resonant frequency of the bar for longitudinal vibration, there will be no resonant amplification of vibration in the longitudinal direction, and vibration in that direction may be neglected for present purposes. The drive motor is again effectively speed-controlled through a frequency step-down characteristic from a back-reaction or feedback from the resonantly vibrating bar.

FIG. 5 shows one further illustrative embodiment of the invention, showing only a fragmentary upper end portion of an elastic bar which may be assumed to be a bar capable of resonant standing wave vibration, either in the lateral or the longitudinal mode. The elastic bar is in this instance designated generally by the numeral 75, and may be very much like the bar 60 of FIGS. 3 and 4, having at the upper end portion thereof a somewhat enlarged head portion 75a, formed with a circular opening providing a raceway 75b for a cylindric inertia rotor 76. The latter has an internal bore 76a, and arranged for projection through raceway 75b on the axis of the latter is drive shaft 77, understood to be driven from a suitable drive motor, such as an induction motor or a fluid motor, not shown. This shaft 77 may be provided with any suitable bearing means, supported externally of the vibratory system, if desired, or as in FIGS. 3 and 4. In place of the spiral or coil spring 74 of the embodiment of FIGS. 3 and 4, there are employed in the embodiment of FIG. 5 a plurality of elastic bristles 78, which extend from the shaft 77 and drivingly engage against the interior of the rotor 76. These bristles can be fine steel wires, silver soldered to the rotating shaft. The outside peripheries of these bristles bear frictionally upon the inside of the gyrating rotor 76. Preferably, in order to improve the friction factor, the bristles have a length substantially greater than the radial spacing between the shaft 77 and the interior surface of the hollow cylinder 76 when the latter is centered with the shaft. The flexible and elastic bristles 78 thus function to transmit driving torque from the shaft 77 to the rotor 76, so as to cause the latter to roll around the inside of the bearing surface 75b in the bar 75, and thus, assuming drive of the shaft 77 by its motor in the resonant frequency range of the bar 75, accomplishing resonant standing wave vibration of the bar 75 in a selected resonant standing wave mode. A back-reaction effect from the resonantly vibrating bar 75, such as obtained with the earlier embodiments of the invention, aided by frequency stepdown, operates here also, being transmitted back through the bearing surface of raceway 75b, the gyratory inertia ring 76, and the bristles 78 to the shaft 77 and its drive motor to hold the latter within closely controlled speed limits corresponding to the resonant frequency of the vibratory bar 75.

FIGS. 6–9 show a present practical form of generator in accordance with the invention, being characterized by having a roller running inside a circular race. The generator has a housing 80 made up of an intermediate body member or block 81 and two end caps 82 and 83, together with a spacer member 84 between block 81 and cap 83, said members being typically of rectangular shape as seen in the aspect of FIGS. 6 and 7. The members 81–84 are secured in assembly with one another by bolts 86 and 87. A bore 88 extends through body block 81 and is continued a short distance into end cap 82 and spacer 84, as best seen in FIG. 6. Mounted in this bore 88 is a hardened steel raceway cylinder 89, in which is a cylindrical raceway bore 90. As is shown, a washer 91 is used in spacer 84 at the end of raceway cylinder 89.

Mounted in the raceway bore 90 is a hardened steel cylindrical inertia roller 92, of a diameter somewhat less than the internal diameter of raceway bore 90, often in the typical proportions shown in FIG. 6. The roller 92 is adapted to roll around the inside of the bearing surface defining the bore 90, and its ends are relatively closely confined between the washer 91 at one end and the inside face of cap 82 at the other. A hardened washer may, of course, be inserted between the ends of the roller 92 and the end cap 82, if desired.

Inertia roller 92 has an axial bore 93 which rotatably receive a shaft or axle 94 projecting axially from a spur gear 95. The roller 92 taken together with shaft 94 and the gear 95 comprises a rotor. The gear 95, which may be termed a phasing gear, has a pitch circle corresponding substantially to the diameter of roller 92. This gear 95 meshes with a stationary internal gear 96, which may be termed a raceway gear, and which is formed in the aforementioned spacer 84. Internal gear has a pitch circle corresponding substantially with the diameter of raceway bore 90.

Projecting axially from spur gear 95 is a cup 98 in which is formed an internal drive gear 99, which meshes with an input spur gear 100 which is on the end of a drive shaft 101 journalled in the hub 102 of end cap 83 coaxially with raceway 90. Input gear 100 will be seen to be of somewhat smaller diameter than drive gear 99, and, in the position of the parts illustrated in FIG. 9, to mesh with internal drive gear 99 at the top. Attention is directed to the fact that in this position, phasing gear 95 is in mesh with raceway gear 96 at the bottom, or in other words, at a point diametrically opposite from the point of meshing of gear 99 with gear 100. It will be recalled that this relationship is a characteristic of type No. 1 generators discussed shortly above. In operation, inertia roller 92 rolls around raceway bearing surface 90, and is held in contact therewith by centrifugal force. While the generator is at rest, or coming up to speed, the roller 92 is maintained in close adjacency to bearing surface 90 by means of interengaging conical axial projections 103 and 104 on the axle 94 and gear 100, respectively, and similarly interengaging projections 103' and 104' on the axle 94 and end cap 82, respectively, as clearly shown in FIG. 6.

In operation, rotation of drive shaft 101 turns spur gear 100, which, being in engagement with internal drive gear 99, on one side, i.e. at a point of tangency between the two, causes rotation of gear 99. The phasing gear 95 integral with the thus-driven gear 99, then rolls around the inside of stationary internal gear 96 with which it meshes at its point of tangency diametrically opposite from the point of tangency between the gears 99 and 100. Axle 94 and inertia rotor 92 mounted thereon thus gyrate, with the inertia roller 92 rolling around the inside of cylindrical bearing surface 90. As mentioned hereinabove, when the generator is up to speed, centrifugal force developed by the rotation of the roller 92 causes it to bear with considerable pressure against the bearing surface 90. A good non-slipping, rolling engagement is thereby attained. As will appear, the roller 92 rolls around the inside of cylindrical bearing surface 90 substantially in step with the rolling of the spur gear 95 around the internal gear 96. Any tendency for roller 92 to describe this orbital path with a different rate of rotation on its axis from the rotation of the spur gear 95 on the axis of the latter, is accommodated by a slight relative rotation of roller 92 and the axle 94.

The centrifugal force developed by the relatively heavy inertia roller 92 rolling on its orbital path around the inside of bearing or race ring 89, at the raceway surface 90 therein, results in exertion of substantial gyratory force on the generator housing 80. This gyratory force is transmitted from the generator housing to whatever device is to be subjected to this gyratory force. To accommodate securement or coupling of the housing 80 to a device to be subjected to this gyratory output force, the housing 80 may be provided with any suitable facilities, such as drill holes 109 adapted to receive machine screws, not shown. As mentioned hereinabove, the embodiment of generator shown in FIGS. 6-9, as now described in detail, is of the type No. 1 character defined hereinabove, with drive gear tooth contact on the opposite side of the main longitudinal axis of symmetry of the generator in relation to the point of contact of the phasing gear 95 with the stationary internal gear 96. It will be further noted that the point of driving gear contact between the input gear 100 and the drive gear 99 is diametrically opposite from the point of rolling contact between roller 92 and raceway 90.

Reference is directed to FIGS. 10 and 11, showing a modification of the generator of FIGS. 7-9. The generator of FIGS. 10 and 11 is in most respects identical with that of FIGS. 7-9, and accordingly, corresponding reference numerals, but with the subscript *a* added in the case of FIGS. 10 and 11, are applied to corresponding parts. A second description of these corresponding parts will not be necessary and is omitted. In FIGS. 10 and 11, the phasing gear 95a is like the gear 95 of FIGS. 6-9, but instead of carrying a cup with an internal gear, as in FIGS. 6-9, is formed at one side with a coaxial spur drive gear 112. This spur drive gear 112 meshes with an internal input gear 113 in a cup 114 on the extremity of drive shaft 101a.

The generator thus described operates much as does that of FIGS. 6-9, the only essential difference being that in the case of the generator of FIGS. 10 and 11, the mutual point of contact of the drive and input gears 112 and 113, respectively, is on the same side of the longitudinal axis of the generator as the point of contact between the phasing and raceway gears 95a and 96a, respectively, and also, of course, on the same side as the point of contact between the roller 92a and the raceway surface 90a. The result of this difference, as brought forth in the foregoing general discussion of these types of generators, is the capability of an extreme leverage or gear ratio within the gear drive system, so that high gyration ratios, i.e. frequency step-up ratios, can be accomplished.

FIG. 12 is a view taken in accordance with the line 15—15 on FIG. 10, but showing a modified tooth form for the gear 96a. Incidentally, as will be noted, FIG. 12 shows the gears 95a and 96a enmeshed at the top, whereas in FIG. 10 they are shown in a position enmeshed at the bottom.

The gear means 95a comprises a succession of special teeth or pins 120 having crest or projection portions 121 separated by spaces 122; and these projections mesh with a special cooperating internal gear 96a having grooves 123 between convex, substantially semi-cylindrical teeth 124.

In the embodiment here shown, there is one less tooth on the gear 95a than on the gear 96a, with the consequence that when the teeth of the two gears mesh on one side, they abut at their crests on the opposite side, and are thus held out of mesh on the opposite side. The need for the interference pins 103 and 104 is thus eliminated.

These various gear types, as well as the bristle form shown in FIG. 5, provide a particularly unique and effective approach for the step-up feature because in these multiple-drive connections the torque is carried by a plurality of elements or link members, and this allows substantial power transmission, even with the heavy torque load in this sonic system which results from the step-up ratio.

A number of embodiments of the invention have now been disclosed and it will be understood that these are for illustrative purposes only, and that various changes in design, structure and arrangement may be made without departing from the spirit and scope of the appended claims.

I claim:
1. In a sonic vibration system, the combination of: an elastically vibratory system comprised of a resonator having a resonant frequency range and a portion which vibrates in said resonant frequency range, and sonic vibration generating means for generating vibration in said system in said resonant frequency range comprised of a bearing means fixed to said portion of said elastically vibratory resonator to vibrate therewith, an inertia rotor guided by said bearing means for turning in an orbital path in engagement with said bearing means, said inertia rotor being drivable around said path to vibrate said resonator at a frequency in the region of the resonant frequency, said inertia rotor having a bearing surface which rolls around a closed path defined by said bearing means so that the periodic force reaction of said inertia rotor in its orbit is delivered to said elastically vibratory resonator via said bearing means, the relative circumferential path dimensions of said bearing means and said bearing surface being different but of similar order of magnitude such that said inertia rotor describes more than one cycle around said bearing means while said inertia rotor turns once relative to its own axis, and a rotating drive shaft means for rotating said rotor relative to its own axis, said rotating shaft means being drivingly connected to said rotor through a plurality of link members, all in such manner that said rotating shaft means causes more than one orbital revolution of said inertia rotor and a corresponding number of elastic vibration cycles in said elastically vibratory system for each revolution of said shaft means, and thereby accomplishing a step-up in frequency from said shaft means to said vibratory system whereby said drive means experiences reduced angular reaction and enhanced rotational stability in relation to torque pulses transmitted by back-reaction from said rotor.

2. The apparatus of claim 1 wherein said plurality of link members comprise a multitude of bristle elements.

3. The apparatus of claim 1 wherein said plurality of link members comprise multiple gear teeth.

4. The apparatus of claim 3 wherein said bearing means has connected thereto a gear-type structure consisting of a plurality of convex teeth of substantially semi-cylindrical type, spaced around the periphery of said bearing means, and said rotor has connected thereto a plurality of projections spaced around the periphery of said rotor and arranged to enter in the manner of gear teeth successively between said convex teeth.

5. The apparatus of claim 4, wherein said projections and said convex teeth are different in number so that as they mesh on one side of the combination they abut at their crests on the other side.

References Cited by the Examiner

UNITED STATES PATENTS 2,730,176   1/1956   Herbold _____ 74—87 X

MILTON KAUFMAN, *Primary Examiner.*